United States Patent
Reddick (10) Patent No.: US 8,263,203 B2
(45) Date of Patent: Sep. 11, 2012

(54) FILLER FOR ARTIFICIAL TURF SYSTEM

(75) Inventor: Randolph S. Reddick, Calhoun, GA (US)

(73) Assignee: USGreentech, L.L.C., Cincinnati, OH (US)

( * ) Notice: Subject to any disclaimer, the term of this patent is extended or adjusted under 35 U.S.C. 154(b) by 113 days.

(21) Appl. No.: 11/373,885

(22) Filed: Mar. 13, 2006

(65) Prior Publication Data

US 2006/0147670 A1 Jul. 6, 2006

Related U.S. Application Data

(63) Continuation-in-part of application No. 10/811,737, filed on Mar. 29, 2004, now Pat. No. 7,144,609, which is a continuation-in-part of application No. 10/422,129, filed on Apr. 24, 2003, now Pat. No. 6,884,509.

(51) Int. Cl.
*B32B 3/02* (2006.01)
*B32B 33/00* (2006.01)
*A41G 1/00* (2006.01)

(52) U.S. Cl. ............... 428/87; 428/17; 428/95
(58) Field of Classification Search ............ 428/87, 428/17, 95

See application file for complete search history.

(56) References Cited

U.S. PATENT DOCUMENTS

| | | | |
|---|---|---|---|
| 2,106,317 A | 1/1938 | Dezendorf | |
| 2,695,851 A | 11/1954 | Lodge | |
| 2,700,003 A | 1/1955 | Gundlach | |
| 2,934,455 A | 2/1956 | Dober | |
| 3,003,643 A | 10/1961 | Thomas | |
| 3,079,209 A | 2/1963 | Boggus | |
| 3,092,836 A | 6/1963 | Boggus | |
| 3,099,574 A | 7/1963 | Bernier | |
| 3,441,362 A | 4/1969 | Streck | |
| 3,443,492 A | 5/1969 | Pleass | |
| 3,503,771 A | 3/1970 | Kroyer | |
| 3,513,061 A * | 5/1970 | Vinicki | 428/17 |
| 3,513,062 A * | 5/1970 | Vinicki | 428/17 |
| 3,557,038 A | 1/1971 | Gebura | |
| 3,795,180 A | 3/1974 | Larsen | |
| 3,917,771 A | 11/1975 | Basile | |
| 4,188,154 A | 2/1980 | Izatt | |

(Continued)

FOREIGN PATENT DOCUMENTS

DE 195 40 623 A1 5/1997

(Continued)

OTHER PUBLICATIONS

JPO machine translation of JP 05-171611 A (1993).*

(Continued)

*Primary Examiner* — Cheryl Juska
(74) *Attorney, Agent, or Firm* — Wood Herron & Evans LLP (57) ABSTRACT

Artificial turf for use with an artificial turf system, which may also include a base layer and a support layer. The artificial turf comprising a backing supporting pile tufts of between ¼" to 4" in length, in position on its upper surface. The backing may comprise a porous synthetic foam or backing sheet. A filler of particles shaped to have no sharp edges and of substantially equal size are interspersed over the backing and about the tufts up to at least half thick length. The artificial turf substantially retains its resiliency, porosity and equal density throughout.

8 Claims, 7 Drawing Sheets

U.S. PATENT DOCUMENTS

| | | | |
|---|---|---|---|
| 4,268,551 A | 5/1981 | Moore, Jr. | |
| 4,356,220 A | 10/1982 | Benedyk | |
| 4,412,015 A | 10/1983 | Lustgarten et al. | |
| 4,462,184 A | 7/1984 | Cunningham | |
| 4,497,853 A | 2/1985 | Tomarin | |
| 4,606,963 A | 8/1986 | Farrell | |
| 4,749,479 A | 6/1988 | Gray | |
| 4,750,909 A | 6/1988 | Streck | |
| 4,913,596 A | 4/1990 | Lambert, III | |
| 4,934,865 A | 6/1990 | Varkonyi et al. | |
| 5,017,040 A | 5/1991 | Mott | |
| 5,041,320 A * | 8/1991 | Meredith et al. | 428/87 |
| 5,064,308 A | 11/1991 | Almond et al. | |
| 5,076,726 A | 12/1991 | Heath | |
| 5,151,123 A | 9/1992 | Kviesitis | |
| 5,250,340 A | 10/1993 | Bohnhoff | |
| 5,254,364 A | 10/1993 | Kviesitis | |
| 5,264,029 A | 11/1993 | Kviesitis | |
| 5,306,317 A | 4/1994 | Yoshizaki | |
| 5,383,314 A | 1/1995 | Rothberg | |
| 5,411,352 A | 5/1995 | Eren | |
| 5,458,973 A | 10/1995 | Jeffs | |
| 5,460,867 A | 10/1995 | Magnuson et al. | |
| 5,538,787 A | 7/1996 | Nachtman et al. | |
| 5,583,165 A | 12/1996 | Kviesitis | |
| 5,618,131 A | 4/1997 | Weber | |
| 5,688,073 A | 11/1997 | Brodeur et al. | |
| 5,752,784 A | 5/1998 | Motz et al. | |
| 5,780,144 A | 7/1998 | Bradley | |
| 5,820,296 A | 10/1998 | Goughnour | |
| 5,823,711 A | 10/1998 | Herd et al. | |
| 5,848,856 A | 12/1998 | Bohnhoff | |
| 5,849,124 A | 12/1998 | Rusk, Jr. | |
| 5,908,673 A | 6/1999 | Muhlberger | |
| 5,950,936 A | 9/1999 | Bergart | |
| 5,958,527 A * | 9/1999 | Prevost | 428/17 |
| 6,029,477 A | 2/2000 | Harvey, Jr. | |
| 6,168,102 B1 | 1/2001 | Bergart | |
| 6,221,445 B1 | 4/2001 | Jones | |
| 6,235,372 B1 | 5/2001 | Joedicke | |
| 6,238,794 B1 | 5/2001 | Beesley | |
| 6,263,633 B1 | 7/2001 | Hagenah | |
| 6,299,959 B1 | 10/2001 | Squires et al. | |
| 6,338,871 B1 | 1/2002 | Shin | |
| 6,432,505 B1 * | 8/2002 | Sweenie et al. | 428/92 |
| 6,443,996 B1 | 9/2002 | Mihelich | |
| 6,500,543 B2 | 12/2002 | Sakai | |
| 6,551,689 B1 * | 4/2003 | Prevost | 428/143 |
| 6,582,819 B2 | 6/2003 | McDaniel et al. | |
| 6,610,405 B2 | 8/2003 | Iriguchi et al. | |
| 6,630,530 B1 | 10/2003 | Han | |
| 6,632,527 B1 | 10/2003 | McDaniel et al. | |
| 6,645,627 B1 | 11/2003 | Rossi | |
| 6,689,447 B2 * | 2/2004 | Prevost | 428/87 |
| 6,740,387 B1 * | 5/2004 | Lemieux | 428/95 |
| 6,746,752 B2 | 6/2004 | Provost | |
| 6,800,339 B2 | 10/2004 | Motz et al. | |
| 6,818,274 B1 | 11/2004 | Buck et al. | |
| 6,818,300 B2 | 11/2004 | Loyd et al. | |
| 6,884,509 B2 * | 4/2005 | Huff et al. | 428/403 |
| 6,946,181 B2 * | 9/2005 | Prevost | 428/87 |
| 7,144,609 B2 * | 12/2006 | Reddick | 428/17 |
| 7,153,553 B2 * | 12/2006 | Tetrault | 428/17 |
| 7,300,689 B2 * | 11/2007 | Prevost | 428/17 |
| 7,306,838 B2 * | 12/2007 | Prevost | 428/87 |
| 2002/0006481 A1 | 1/2002 | Morris | |
| 2003/0118755 A1 * | 6/2003 | Motz et al. | 428/17 |
| 2003/0161996 A1 * | 8/2003 | Prevost | 428/143 |
| 2003/0175448 A1 * | 9/2003 | Prevost | 428/15 |
| 2003/0182855 A1 * | 10/2003 | Prvost | 47/58.1 R |
| 2004/0028841 A1 * | 2/2004 | Motz et al. | 428/17 |
| 2004/0229007 A1 | 11/2004 | Motz et al. | |
| 2005/0031803 A1 * | 2/2005 | Prevost | 428/17 |
| 2005/0042032 A1 | 2/2005 | Motz et al. | |
| 2006/0121236 A1 * | 6/2006 | Prevost | 428/85 |
| 2006/0134374 A1 * | 6/2006 | Bell et al. | 428/97 |
| 2006/0147670 A1 * | 7/2006 | Reddick | 428/86 |
| 2007/0160800 A1 * | 7/2007 | Reddick | 428/87 |
| 2007/0254131 A1 * | 11/2007 | Shail et al. | 428/95 |
| 2008/0145574 A1 * | 6/2008 | Julicher et al. | 428/17 |
| 2008/0268184 A1 * | 10/2008 | Cook | 428/17 |
| 2009/0011845 A1 * | 1/2009 | Weber et al. | 472/92 |
| 2009/0011873 A1 * | 1/2009 | Weber et al. | 473/497 |
| 2009/0162578 A1 * | 6/2009 | Van Balen et al. | 428/17 |
| 2009/0208674 A1 * | 8/2009 | Murphy et al. | 428/17 |

FOREIGN PATENT DOCUMENTS

| | | | |
|---|---|---|---|
| JP | 05171611 A | * | 7/1993 |
| JP | 2003171908 A | * | 6/2003 |
| WO | 03 042293 A1 | | 5/2003 |
| WO | 2004 056881 | | 7/2004 |

OTHER PUBLICATIONS

JPO machine translation of JP 2003-171908 A (2003).*
U.S. Patent and Trademark Office, Office Action in related U.S. Appl. No. 11/713,891, dated Oct. 8, 2008, 10 pp.
U.S. Patent and Trademark Office, Office Action in related U.S. Appl. No. 11/713,891, dated May 13, 2009, 16 pp.
U.S. Patent and Trademark Office, Office Action in related U.S. Appl. No. 11/713,891, dated Jun. 17, 2009, 5 pp.
U.S. Patent and Trademark Office, Office Action in related U.S. Appl. No. 10/811,737, dated Feb. 3, 2006, 14 pp.
U.S. Patent and Trademark Office, Office Action in related U.S. Appl. No. 10/811,737, dated May 9, 2006, 8 pp.
U.S. Patent and Trademark Office, Office Action in related U.S. Appl. No. 10/811,737, dated Jul. 25, 2006, 11 pp.
U.S. Patent and Trademark Office, Office Action in related U.S. Appl. No. 10/422,129, dated Oct. 4, 2004, 8 pp.
U.S. Patent and Trademark Office, Office Action in related U.S. Appl. No. 10/422,129, dated Jan. 12, 2005, 8 pp.
Vance Bros. Inc., "Advantage Sport Coating Products" brochure, 3 pp.
Latex-Ite, "Aggregate Filled Acrylic Color System Product Specifications", brochure, 1997, 3 pp.
"Material Safety Data Sheet" brochure, Jan. 15, 2003, 2 pp.
English translation of JP5171611 in the name of Sekisui Chemical Co., Ltd., published Jul. 9, 1993.

* cited by examiner

FILLER FOR ARTIFICIAL TURF SYSTEM

CROSS REFERENCE TO RELATED APPLICATION

This application is a Continuation-In-Part of application Ser. No. 10/811,737 filed Mar. 29, 2004, now U.S. Pat. No. 7,144,609, which is a Continuation-In-Part of application Ser. No. 10/422,129, filed Apr. 24, 2003, now U.S. Pat. No. 6,884,509, the subject matters of which are incorporated herewith.

BACKGROUND OF THE INVENTION

Artificial turf systems are old and well-known. The original systems had the problem of losing their resiliency over a substantially short period of time, after which they became unsatisfactory for certain uses. Another factor which creates problems is that certain fillers are not fireproof, and in fact, will burn, which creates a fire hazard. Finally, certain fillers contain dust and when used indoors, tend to pollute the atmosphere.

Accordingly, it is an object of the instant invention to provide a filler for use with an artificial turf system which will allow the system to be evenly resilient throughout.

Another object of the instant invention is to provide a filler for use with an artificial turf system which retains its resiliency over an extended period.

Another object of the invention is the provision of a filler which does not pack or mound.

Another object of the invention is the provision of a non-porous filler.

Another object of the invention is a filler which contains no sharp edges and is substantially evenly sized.

Another object of the invention is the provision of a filler which is non-flammable, dust free, non-absorbent and recyclable.

Another object of the invention is a filler which is formed from waste products or a recycled material.

Another object of the invention is a filler which maintains a low G-max.

Another object of the invention is an artificial turf system with improved safety.

SUMMARY OF THE INVENTION

The instant invention is directed to a filler for use in an artificial turf system which may include a support layer, a base layer, and an outer layer. The support layer comprises an area of selected size which may consist of smoothed sand, compacted soil, fiber reinforced soil, gravel, asphalt, concrete or a combination thereof.

The base layer comprises at least one grid which consists of a plurality of interconnected cells arranged over and supported by the support layer. Each cell of the cells forming the grid comprises an upstanding tubular member having an upper portion of a first diameter, which functions to support the outer layer, and a lower portion of a second diameter, which functions to engage with the support layer. The lower portion provides the cell with vertical flexibility, which provides the artificial turf system with vertical movement during use. This vertical movement improves the ability of the turf system to absorb downward forces or impacts.

The base layer may include a transition layer arranged over the mat or grids. The transition layer may be comprised of a grate formed of at least two arrays of substantially diagonally arranged synthetic rods or filaments preferably formed of polyethylene. The arrays of rods may be fused or secured at crossing points. Each of the rods may be circular or oval shaped and may be of differing sizes. Additionally, the transition layer preferably includes a porous felt secured over at least one surface of the grate. The rods or filaments range between 2-12 mm diameter. The felt is preferably between 4 and 10 oz. per square yard and made of polypropylene. Other synthetic filaments may be used.

The outer layer includes pile secured with a backing fabric which is preferably supported on the transition layer. The pile may also be secured with a foam backing which may be supported directly on the upper surface of the mat. A filler is spread evenly over the pile fabric to cover the surface of the backing fabric and to surround and cover desired portions of the pile tufts. It is preferred that the filler is STF (coated silicone dioxide particles) or glass beads. The fillers may be combined with ground rubber.

The pile tufts extending from the backing fabric are between ¼" to 4" in length and preferably formed of synthetic ribbons of between about ½₂" to ⅜" in width. The backing fabric is preferably formed of porous synthetic material which secures the pile tufts in fixed positions.

A preferred filler comprises polished silicon dioxide particles or beads which are of substantially equal size. The filler is interspersed over the backing fabric to fill about the tufts up to at least half their length. The silicon dioxide particles are polished and coated to provide an impervious filler. The filler allows the outer layer to retain its porosity.

The silicon dioxide and glass beads may be colored one of brown, green, red, and black. They may comprise a combination of these colors or they may be natural color. The silicon dioxide and glass beads range in size between 8 and 60 mesh. The silicon dioxide and glass beads are substantially round so as not to present sharp edges. The filler beads are sized to be within about five mesh sizes and are spread over the pile tufts evenly to a depth of between 0.25 to 2.00 inches. The glass beads are arranged over the backing at between 4 pounds and 6 pounds per square foot.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
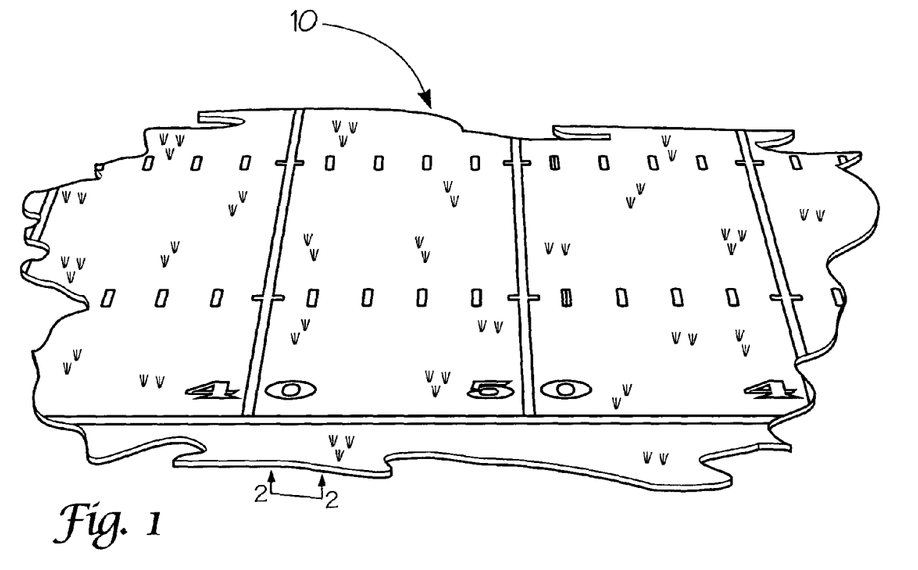
FIG. 1 is a perspective view of a sports field employing artificial turf.

The artificial turf system is designed to be usable for many different purposes such as sports surfaces, landscaping, equine facilities and the like. The sports surface illustrated in FIG. 1 is a ball field. The arrangement is equally adaptable as playgrounds, putting greens and track facilities. In order to function in these areas, the artificial turf system must be of proper firmness, be durable, have proper drainage capability, and be easily installed. In the case of sport and equine facilities, it is also necessary that the turf system have proper abrasiveness, traction, flame retardance and not present fungicidal problems. It is also most necessary that the field maintain an even surface and not pack or mound unnecessarily.

Turning now to FIGS. 2-5, the artificial turf system of the invention is shown broken into three components, i.e. outer layer A, base layer B and support layer C.

Support layer C may be no more than compacted soil or it may be comprised of crushed stone, crushed stone and sand, asphalt, concrete or a combination thereof. This layer is identified as support base 12.

It may be desirable to place a stabilizer sheet 14 over base 12. Stabilizer sheet 14 is a flexible non-porous plastic sheet which assists with drainage and provides a stabilizing support for grid system 16.

Base layer B is positioned over and is supported on support layer C. Base layer B includes a mat which is made up of a plurality of grids 16 connected together. The mat is preferably formed to conform with the shape of support layer C. There could be a plurality of mats laid side-by-side over an extremely large support layer.

Each grid 16 is formed of a plurality of interconnected cells 18 which comprise cylinders formed of semi-rigid or semi-flexible plastic. Grids 16 are preferably formed in rectangular or square segments, however, any polygonal shape is acceptable. Cells 18 are more fully described in co-pending application Ser. No. 10/811,737 earlier referred to.

Upper section 20 of each cell 18 has an upper end 21 which is generally designed to engage with outer layer A. Vents 23 are formed about the periphery of the upper section to allow hot air to exit the cylinder.

Lower section 22 of each cell 18 extends radially downward and outward from the lower end of upper section 20 forming a cone-shaped lower section. Lower section 22 extends from the vertical axis of the cell at an angle of about 75°. Lower section 22 may have a continuous radial surface or it may be in the form of a plurality of radially extending members. In either instance, lower section 22 provides resilience or movement of a cell in the vertical direction when it is impacted with weight. The degree of downward movement from its normal height x to a compressed height y or between ¹⁄₁₆ and ⅛ inch.

Cylinders 18 preferably extend vertically to about 1" in height with the upper portion being bout ¾" and the lower portion about ¼".

Grids 16 comprise a plurality of cells 18 which are interconnected by securing members. The securing members engage with the adjacent cell peripheries, preferably the lower edge of lower section 22. The cells forming a grid are arranged along opposed axes with each axis being separated by about 4".

The securing members are generally diamond shaped and comprise flexible synthetic filaments or rods interconnected to allow vertical, diagonal and horizontal movement between the adjacent cells. This flexibility allows the cells forming the grids to conform with the topography of the support layer, insuring even engagement between each cell and the support layer.

In use, grids 16 which may also be integrally formed, preferably by molding, are interconnected forming mat 16 or a plurality of mats which then are placed over support layer C. The lower ends of lower portions 22 are positioned in engagement with support layer 12 or with stabilizer sheet 14.

Figure 4:
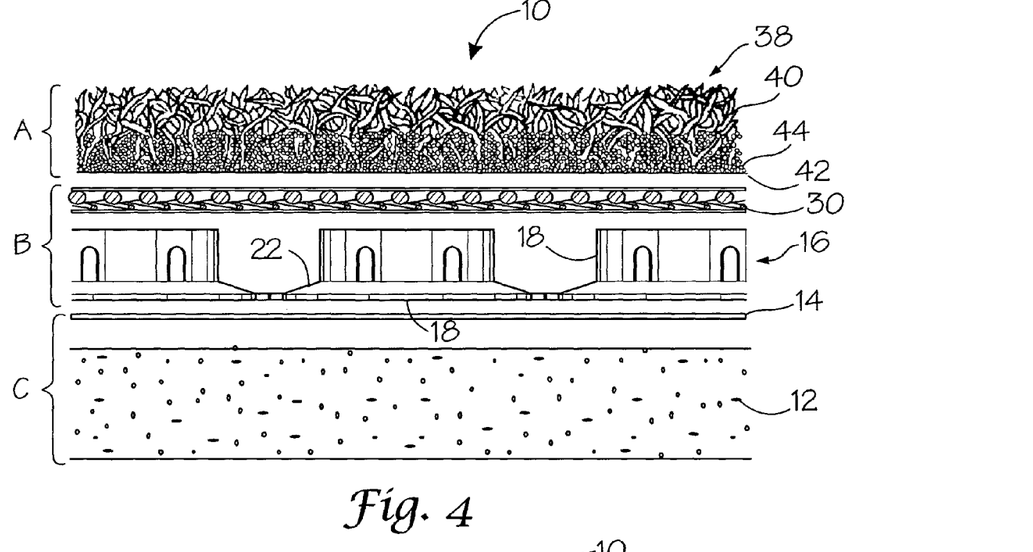
FIG. 4 is an exploded cutaway side view of a first arrangement of the artificial turf system of the invention.
Figure 6:
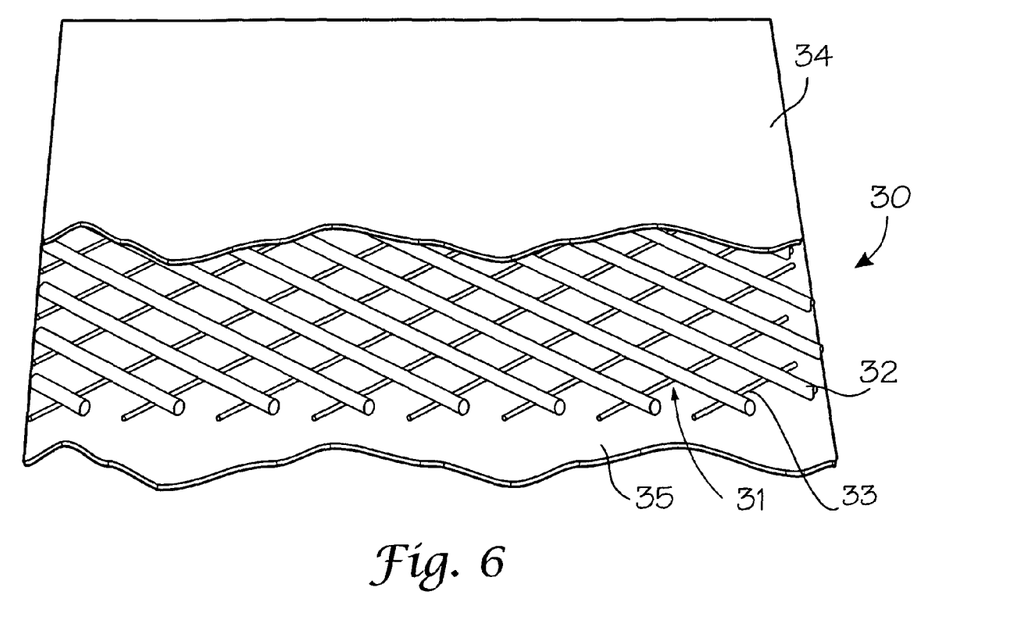
FIG. 6 is a sectional view of the transition layer.

In certain instances, base layer B includes a transition layer 30 as best shown in FIGS. 4 and 6. Transition layer 30 preferably consists of a screen or grate 31 which is formed of diagonally disposed semi-rigid synthetic rods or filaments 32, 33 having a diameter of between 1 and 6 mm. Generally rods 32 are of larger diameter than rods 33, however, this is not necessarily so. Preferably, the rods are formed of polyethylene. It is preferred that screen 31 be a unitary molded unit sized to match the grid size. They could be made in larger sheets and cut to size. Also they could be synthetic filaments bonded together. It is only necessary that screen 31 be sufficiently rigid to assist the cells in supporting the outer layer and yet provide sufficient vertical give to improve the resilience against impact of the artificial turf system.

Preferably felts 34, 35, which are formed of synthetic yarns, are positioned to be secured with the top and bottom surfaces of screen 31. Felts 34, 35 are formed to be between 4 and 10 ounces per square yard. The felts must be sufficiently porous to provide drainage from the outer layer through the base layer. The transition layer primarily assists in providing uniform vertical support of the outer layer while the felts provide padding which assists in reducing wear between the outer layer and the tops of the coils.

Figure 2:
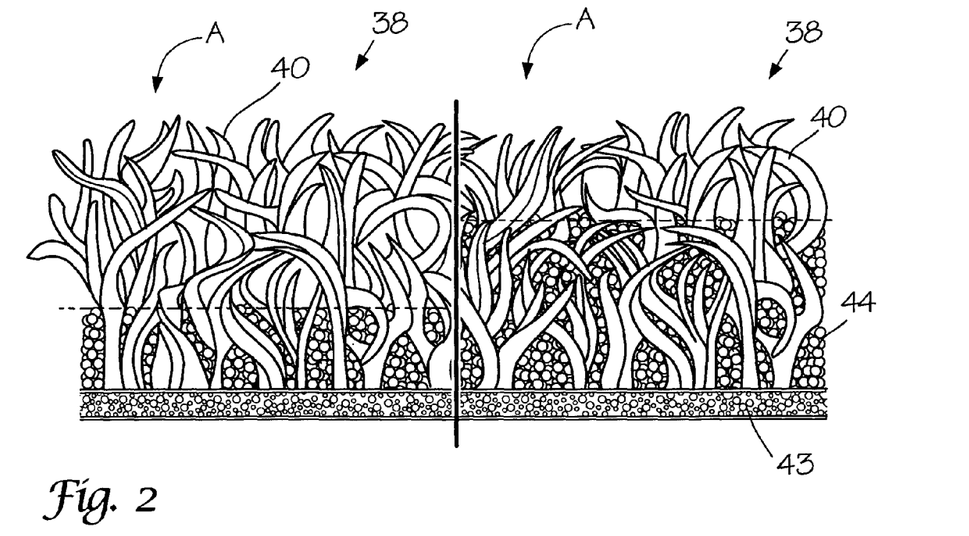
FIG. 2 is an exploded cutaway side view of a first arrangement of the filler in use with an artificial turf system of the invention.
Figure 3:
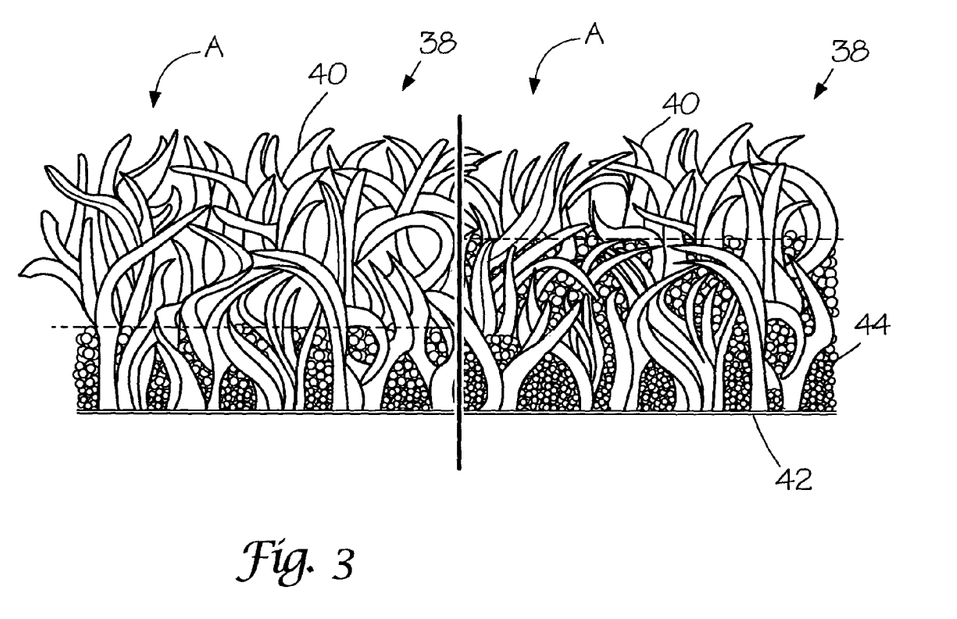
FIG. 3 is similar to FIG. 2, showing a second arrangement of the filler in use with a turf system of the invention.

Turning now to FIGS. 2 and 3, outer layer A comprises a pile fabric 38 which consists of pile tufts 40 secured with backing 42, 43.

Pile tufts 40 are preferably formed of polyethylene, polypropylene, nylon or a combination. The tuft forming synthetic filaments have a ribbon-like cross-section of between about ¹⁄₃₂" to ⅜" in width. The pile tufts are formed to a height, which may be uniform or may vary, of between ¼" to 4". The pile tufts are secured with backing fabric 42, 43 by tufting, weaving, braiding or bonding as desired.

Figure 5:
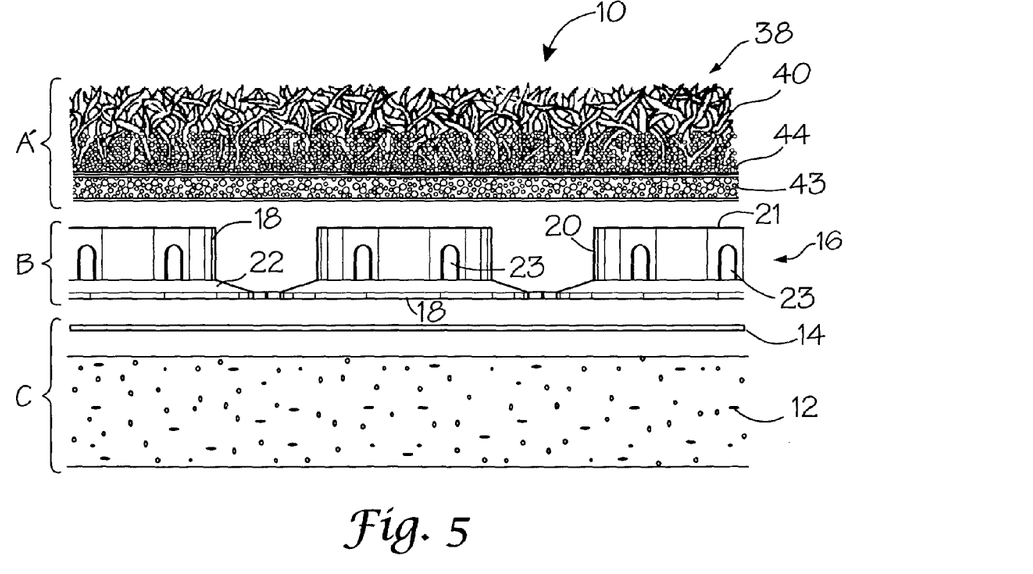
FIG. 5 is similar to FIG. 4 showing a second arrangement of the artificial turf system of the invention.

The backing is preferably a porous textile fabric as shown at 42. When the fabric is employed to retain the tufts, it is desirable that transition layer 30, as shown in FIGS. 4 and 6, be positioned between the backing fabric and grid 16 or support layer C, so that backing fabric 42 is supported on the transition layer. Alternatively, the backing may comprise a ½" composite foam and fabric sheet 43 as shown in FIGS. 2 and 5. Backing 43 is preferably a polyurethane, polyethylene or latex sheet between 1 and 2 cm thick. When using backing 43, it is normally not necessary to provide transition layer 30 as backing 43 provides sufficient support or vertical resilience. In both instances, it is desirable that the backing material be porous.

A filler 44 is distributed evenly over backing 42, 43 and about pile tufts 40. In FIG. 2, filler 44 comprises evenly sized beads while in FIG. 3, filler 44 comprises variable sized beads. The filler is applied to a depth of between 0.25 to 2.00" depending upon the need. FIGS. 2 and 3 show the filler 44 at a depth such that the height of the pile tufts 40 extends substantially above the filler 44. It is noted that the smaller size beads always work to the bottom. This is why size control is so important. If the beads are too small, they tend to cause uneven drainage.

Figure 7:
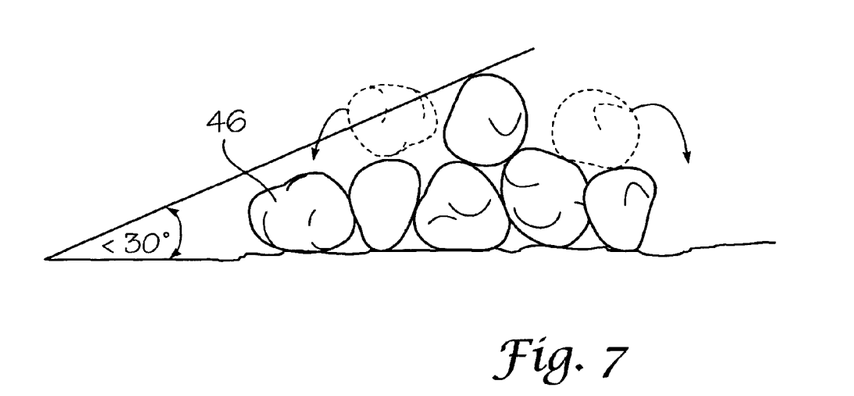
FIG. 7 is a cutaway side view of the angle of repose of the silicone dioxide beads.
Figure 9:
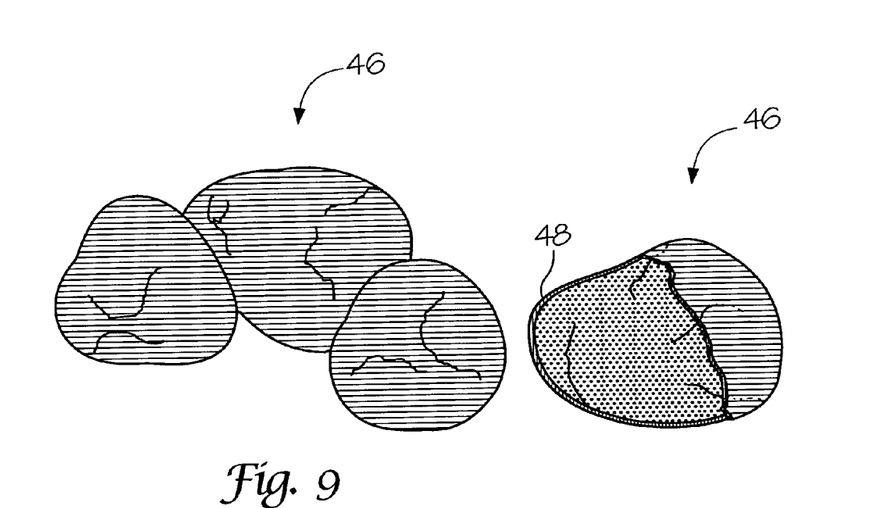
FIG. 9 is an exploded view of the coated silicone dioxide beads of the invention.

It has been found that a filler of silicone dioxide beads or particles, coated to have a non-porous outer surface as shown in FIGS. 7 and 9, are most desirable. These beads or particles are substantially round with no sharp edges. They are sized and cleaned, prior to coating, to be between 8 and 60 mesh and are substantially dust free. Due to the roundness of the particles of silicone dioxide, this filler does not pill or mound and maintains an angle of repose of about 30°. This feature, while maintaining an even surface, assists tremendously in maintaining even porosity and a constant G-force factor.

As noted above, silicone dioxide beads 46 are slightly porous and it is desirable to coat the outer surfaces thereof with an acrylic sealer 48 as shown in FIG. 9. Other sealers may be used if desired. The coated silicone dioxide particles or beads are also referred to as STF.

It may also be desirable to color the silicone beads to enhance the appearance of the artificial turf. Desirable colorants are iron oxide (Fe Oz) for black and chrome (iii) oxide ($Cr_2O_3$) for green. Other natural colorants are available for other colors or shades.

Figure 8:
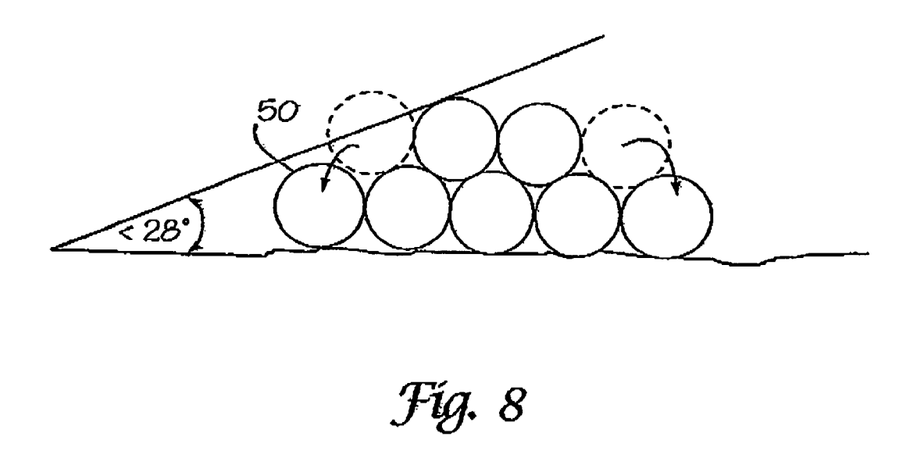
FIG. 8 is a cutaway side view of the angle of repose of the glass beads.
Figure 10:
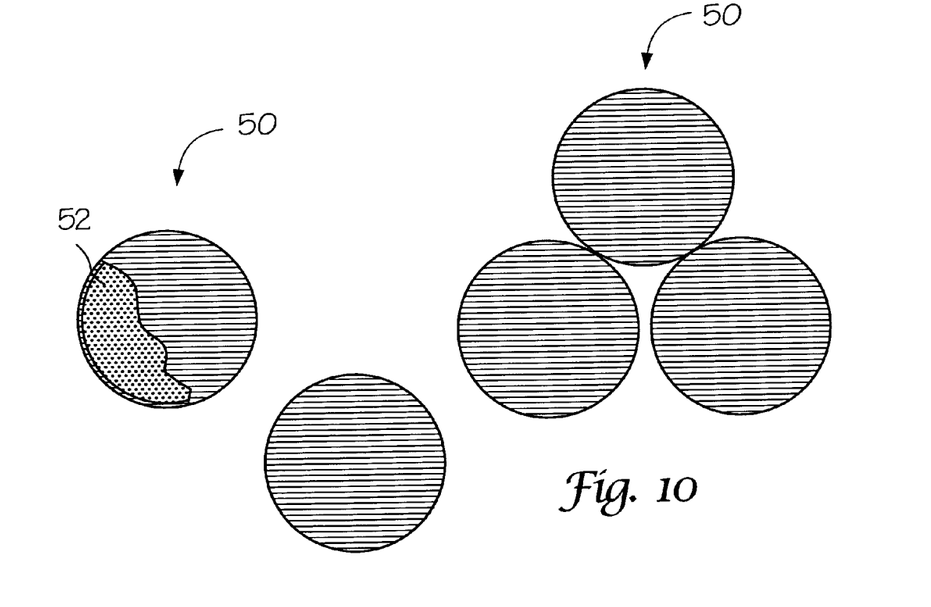
FIG. 10 is an exploded view of the glass beads of the invention.
Figure 11:
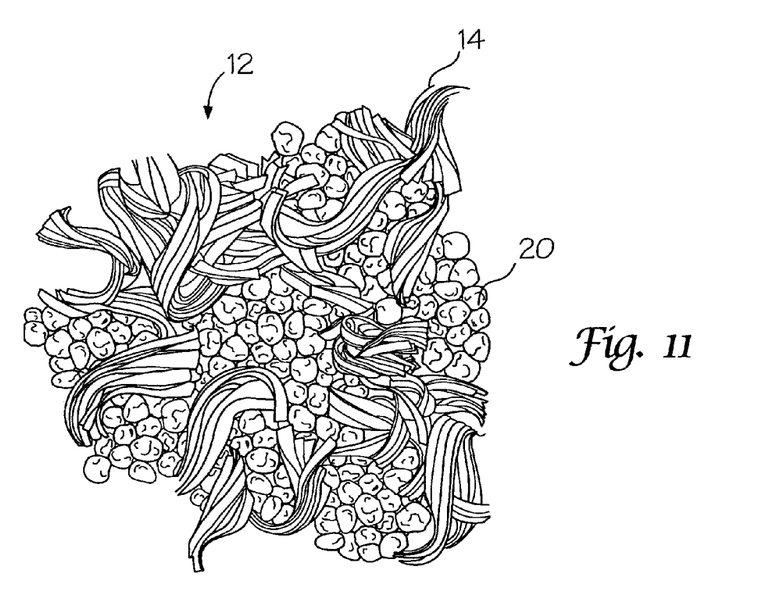
FIG. 11 is a top sectional view of the silicone dioxide beads surrounding and supporting pile tufts.
Figure 12:
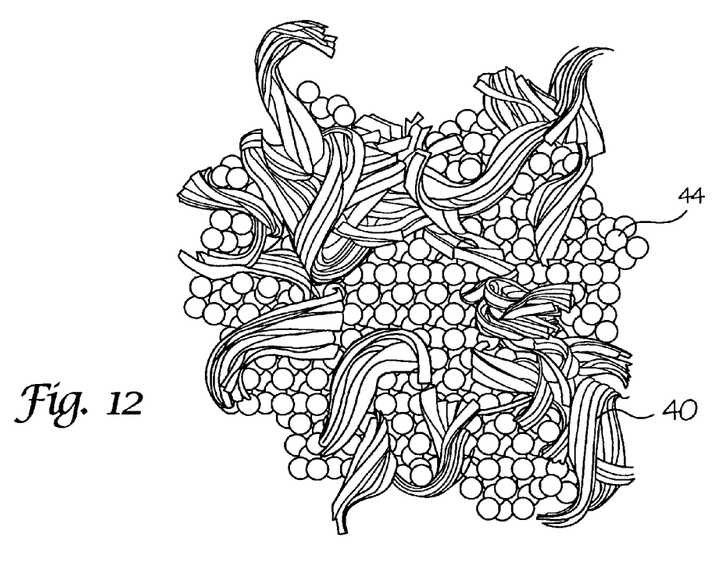
FIG. 12 is similar to FIG. 11 showing the glass beads surrounding and supporting pile tufts.

Glass beads 50 as shown in FIGS. 8 and 10, provide another excellent improvement over the current standard fillers, i.e. sand and recycled rubber. Glass beads are affordable, they are clean, they do not produce dust, they are non-porous and they do not burn. Of equal importance, the glass beads may be formed from discarded or waste glass. This waste glass is referred to as "cullet".

The glass is crushed into granules which are then passed through screens and sized. The sized glass granules are then heated to a slightly less than molten state and passed into a tumbler where they are tumbled until round. The round glass beads 50 are then cooled. The beads range in size between 0.25 mm to 5 mm or between 8 and 60 mesh.

Glass beads 50 may be coated with synthetic polymer 52 to enhance the smoothness and lower the co-efficient of friction of their outer surface. Polymer 52 may be of the group consisting of epoxy, acrylic, urethane or Teflon® (ie., a polytetrafluoroethylene manufactured by E.I. Du Pont De Nemours and Company Corporation).

Due to their low co-efficient of friction and their smooth outer surface, glass beads 50 maintain an angle of repose of less than 28° as indicated in FIG. 8 which is slightly better than the angle of repose of the silicone dioxide beads. Glass beads 50, because they do not pill but retain such a slight angle of repose, provide equal drainage throughout and a smooth outer surface.

The glass beads have a hardness of at least six on the Mohs scales and provide permanent low G-max levels in the artificial turf system.

It is noted that satisfactory results have been achieved when using mixtures of silicone dioxide or glass beads mixed with ground rubber or with sand.

Artificial turf systems when installed must be sufficiently stable so as to maintain a generally even outer surface. These systems must also be resilient within limits so that the stability of the surface is sufficiently hard so as to provide positive footing and yet is sufficiently resilient to provide sufficient give so as to not cause undue injury.

There have been tests developed to determine the physical capabilities of artificial turf systems. An industry accepted test for determining the resiliency or shock absorbing capability of artificial turf is conducted by TSI, i.e. Testing Services Inc. of Dalton, Ga. TSI conducts tests which reveal the G-max of an artificial turf system when installed and the G-max of that system after extended time or use.

For an artificial turf system to be acceptable, the G-max must be and remain within the range of 90 to 120.

Tests conducted on the artificial turf systems above described fillers or beads provided results indicating that the systems, as installed, possessed a G-max of about 100, and as such, are at a very acceptable level of hardness. Continued testing over time, which equates with extended use when installed, resulted in an initial increase in G-max of between 5 and 14%, and generally about 7% with the system using silicone dioxide beads 46. With the system using glass beads 50, the initial increase in G-max was generally about 5%. The synthetic turf systems of the invention substantially retained this G-max through extended further testing. The G-max for the system, after extended use, using silicone dioxide beads 46 held a G-max of about 110, while the system using glass beads 50 held a G-max of about 100. A G-max of between 105 and 114 is most acceptable.

Other artificial turf systems using sand or ground rubber have also been tested by TSI. The results of these tests indicated an initial G-Max of about 100. However, with continued testing over time, the G-Max of these products showed a continuous increase of up to between 25% to 40%. This increase in the G-Max indicates that these tested turf systems, in a short space in time, would degrade to the point of becoming unsatisfactorily hard, requiring replacement.

While preferred embodiments of the invention have been described using specific terms, such description is for illustrative purposes only, and it is to be understood that changes and variations may be made without departing from the spirit or scope of the following claims.

What is claimed is:

1. An artificial turf for an athletic field, comprising:
   a base;
   a porous foam sheet residing on the base;
   a porous backing residing on the foam sheet, the backing including pile tufts having a length of 0.25" to 4" secured to and extending upwardly therefrom; and
   a filler evenly distributed over the backing at between 4 and 6 lbs/sq ft. and supporting the pile tufts, the filler consisting essentially of non-porous, substantially round beads of restricted size profile, wherein the beads resist mounding, repel water, resist compacting, present no damaging sharp edges when incorporated with the turf, and are environmentally safe, the beads having an angle of repose no more than about 30 degrees;
   wherein the artificial turf retains a relatively constant G-max throughout extended use, and wherein the beads are glass beads coated with at least one of: epoxy, acrylic, urethane, and polytetrafluoroethylene.

2. The artificial turf of claim 1, wherein the pile tufts extend substantially above the top of the filler.

3. The artificial turf of claim 1, wherein the filler is substantially dust free.

4. The artificial turf of claim 1, wherein the beads of the filler are sized between 8 and 60 mesh.

5. The artificial turf of claim 1 wherein the beads are within about five mesh sizes.

6. The artificial turf of claim 1, wherein the turf maintains a G-max within about 20% of a G-max of 100.

7. The artificial turf of claim 1, wherein the layer of filler is porous even though the beads themselves are non-porous.

8. The artificial turf of claim 1, wherein the pile tufts have a length in the range of about 1.5" to 4".

* * * * *